3,222,317
POLYVINYL CHLORIDE STABILIZED WITH A COMBINATION OF ORGANOTIN COMPOUNDS AND AROMATIC NITROGEN COMPOUNDS
Otto S. Kauder, Jamaica, N.Y., assignor to Argus Chemical Corporation, Brooklyn, N.Y., a corporation of New York
No Drawing. Filed Dec. 19, 1961, Ser. No. 161,769
13 Claims. (Cl. 260—45.75)

This invention relates to polyvinyl chloride resin compositions having an improved resistance to deterioration by heat due to the presence therein, in combination, of an organotin compound and an aromatic amine. This application is a continuation-in-part of copending application Serial No. 148,687 filed October 30, 1961 and now abandoned.

Many organotin compounds are now widely recognized as the best available single-compound stabilizers for polyvinyl chloride resins. Even the best of these, however, is not always satisfactory.

Numerous types of organotin compounds have been proposed for stabilization of polyvinyl chloride resins, among them, the alkyl tin mercaptides and alkyl tin mercaptoesters described in U.S. Patents Nos. 2,914,506 to Mack, 2,801,258 and 2,891,922 to Johnson, 2,726,254 and 2,870,119 to Leistner, 2,726,227 to Leistner, and 2,641,588 to Leistner, and 2,954,363 to Kuehne; the alkyl tin mercapto acid ester compounds, described in U.S. Patent No. 2,641,596; the alkyl tin amides of thio acids described in U.S. Patent No. 2,704,756 to Leistner: and the alkyl tin cyclic glycol thio acid esters described in U.S. Patent No. 2,752,325 to Leistner; the alkyl tin xanthates described in U.S. Patent No. 2,759,906 to Leistner; and the alkyl tin esters of mercapto alcohols of U.S. Patents Nos. 2,870,119, 2,870,182, 2,872,468, and 2,883,363 to Leistner et al.

These organotin compounds have in common a hydrocarbon group directly attached to tin through a carbon atom, and a sulfur-containing radical attached to the tin through the sulfur atom. This combination of radicals is recognized as giving optimum stabilization, from the standpoint of clarity and minimizing loss of hydrogen halide from the resin. However, sulfur-containing radicals introduce an odor problem.

Several types of organotin compounds have been suggested in which the tin is not linked to sulfur. These compounds have a hydrocarbon group directly attached to tin through a carbon atom, and an oxygen-containing group, such as an alkoxy or an ester group, attached to tin through oxygen. Typical of these compounds are those described in U.S. Patents Nos. 2,938,013 to Mack et al. and 2,680,107 to Leistner et al. However, the oxygen-containing radicals do not impart as good a stabilizing effect as sulfur radicals.

U.S. Patent No. 2,307,157 to Quattlebaum et al. suggests the use of sulfur-free organotin carboxylates as the sole color-stabilizing agents for vinyl chloride compositions. These compounds are not as effective as sulfur-containing compounds, although certain compounds, such as for example, the bis-(dialkyl tin monoester) maleates, complex compounds containing two tin atoms per molecule do yield some degree of protection.

In accordance with the present invention, stabilizer compositions capable of improving the resistance of polyvinyl chloride resins to deterioration when heated at 350° F., are provided comprising an organotin compound free from sulfur, but as effective as the organotin sulfur compounds, and having less odor. The stabilizer compositions of the invention comprise an oranotin oxygen-containing compound, and an aromatic amine enchancing the stabilizig effect of the organotin compound. The aromatic amine alone imparts no observable stabilizing effect, but in combination with the organotin compound, gives a stabilizing effect greater than the latter alone. This is a surprising result, and suggests that the combination is synergistic.

Since 350° F. is the temperature normally employed for gauging the efficacy of polyvinyl chloride resin stabilizers, optimum protection is afforded by means of the stabilizer compositions of this invention.

The organotin compounds can be characterized as having organic groups linked to each tin atom by means of carbon and oxygen atoms only. The organic groups linked to tin through oxygen atoms can each contain from one to about thirty carbon atoms, and are preferably, but not necessarily, derived from polybasic acids. Where polybasic acids are employed, at least one carboxyl group of the polybasic acid will be linked to the tin atom as a carboxylate group, and the other carboxyl group or groups can be present as carboxylic acid groups, or linked to tin as carboxylate groups, or preferably, as ester groups, esterified with a suitable monohydric or polyhydric alcohol.

The organotin compounds useful in this invention can be defined by the formula:

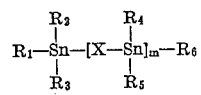

wherein X is oxygen or a bivalent linking radical, linked to tin through oxygen or carbon, and containing from one to about ten carbon atoms, and the R's are organic groups linked to the tin through carbon or oxygen and containing from one to about thirty carbon atoms, at least one being linked through carbon and at least one being linked through oxygen, and $m$ is an integer ranging from zero to about fifteen.

The R groups in the above formula can, for example, be selected from among aryl, aryloxy, alkyl, alkenyl, alkoxy, cycloalkyl, cycloalkenyl, acyl, acyloxy, mixed alkyl aryl, mixed aryl alkyl and heterocyclic groups. The R groups may contain inert substituent groups such as halogen, alkoxy and ester groups.

X can be, for example, alkylene, arylene, aroylene, alkyleneoxy, arylalkylene, alkylarylene and heterocylic groups.

The preferred tin compounds within the generic class applicable to this invention can be further defined by the formula:

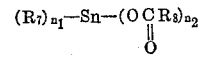

In the above formula, $R_7$ and $R_8$ are hydrocarbon radicals having from about one to about thirty carbon atoms, which can contain inert substituent groups such as halogen, alkoxy and ester groups, and

is a carboxylate group derived from an organic acid which can, if desired, contain additional carboxylic acid groups, ester groups, ether groups and hydroxyl groups. The sum of $n_1$ and $n_2$ is four.

$R_7$ and $R_8$ can, for example, be an aliphatic group such as alkyl and alkenyl, aromatic group such as aryl, mixed alkyl aryl, and mixed aryl alkyl, cycloaliphatic group such as cycloalkyl and cycloalkenyl, or heterocyclic group, such as methyl, ethyl, propyl, propenyl, isopropyl, n-butyl, butenyl, isobutyl, tert-butyl, sec-butyl, amyl, hexyl, octyl, oleyl, 2-ethylhexyl, iso-octyl, lauryl, stearyl, behenyl, phenyl, methoxy phenyl, benzyl, chlorobenzyl, cumyl, allyl, tolyl, xylyl, carboxy-methyl phenyl, furfuryl, cyclohexyl, napthyl, cyclopentyl, furyl, and tetrahydrofurfuryl. The aromatic groups are somewhat less preferred.

The 

group is derived from an organic mono- or poly-carboxylic acid, including aliphatic, aromatic, cycloaliphatic and heterocyclic acids, which can contain inert substituents such as halogen, hydroxyl, keto and alkoxy groups, such as, for example, acetic acid, propionic acid, oleic acid, ricinoleic acid, linoleic acid, stearic acid, butyric acid, valeric acid, chloroacetic acid, hexanoic acid, octanoic acid, lactic acid, levulinic acid, 4-methoxy butyric acid, lauric acid, behenic acid, linoleic acid, palmitic acid, benzoic acid, methylbenzoic acid, cyclohexane carboxylic acid and furoic acid.

The preferred acids from which the 

group is derived are the unsaturated dibasic acids as well as the monohydric and polyhydric alcohol half or mono-esters thereof. Included in this preferred group are maleic acid, fumaric acid, citraconic acid, mesaconic acid, cyclohexene-1,2-dicarboxylic acid, itaconic acid and glutaconic acid and the mono-esters of these acids with, for example, methyl alcohol, ethyl alcohol, propyl alcohol, isopropyl alcohol, n-butyl alcohol, isobutyl alcohol, sec-butyl alcohol, tert-butyl alcohol, 2-ethyl hexyl alcohol, isooctyl alcohol, lauryl alcohol, behenyl alcohol, phenol, cyclohexanol, ethylene glycol, diethylene glycol, triethylene glycol, propylene glycol-1,2, propylene glycol-1,3, butylene glycol-1,4, butylene glycol-1,2, butylene glycol-1,3, decamethylene glycol, dipropylene glycol, ethyl ether of ethylene glycol, and butyl ether of butylene glycol-1,3. Although somewhat less preferred, such saturated polybasic acids as adipic, sebacic, succinic, tartaric, malic, citric, butane 1,2,3,4-tetra carboxylic and glutaric acids and their partial esters are applicable. Unsaturated tribasic acids such as aconitic acid are operative but less preferred.

Where desired, 

groups derived from several different organic acids may be linked to the same tin atom. An example of such a compound is dibutyl tin maleate laurate.

Mixtures of several organotin compounds meeting the requirements of the above definition can be employed where desired.

The following organotin compounds are typical of those coming within the invention:

(1) 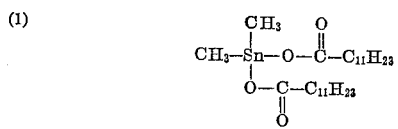

(2) 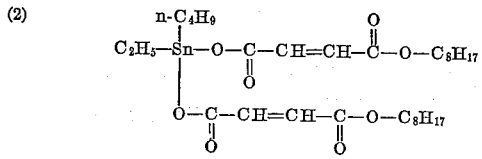

(3) 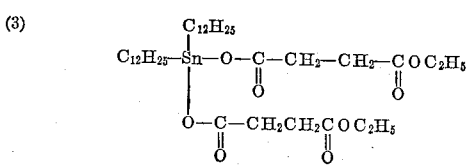

(4) 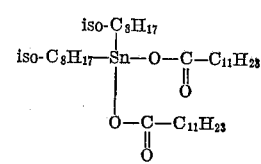

(5) 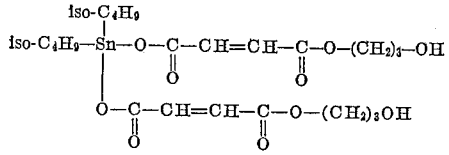

(6) 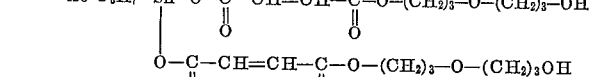

(7) 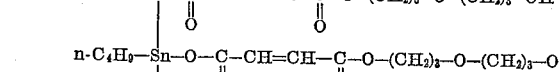

(8) 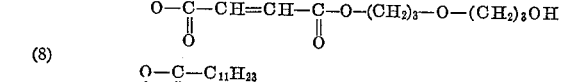

(9) 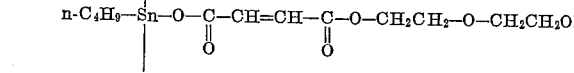

(10) 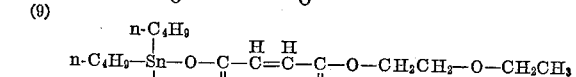

(11) 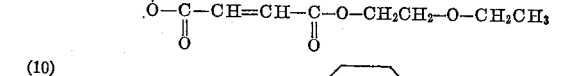

(12) 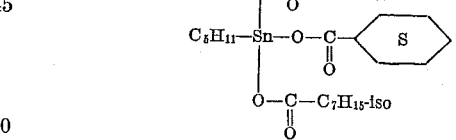

(13) 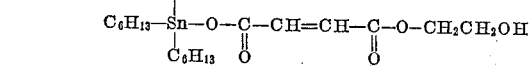

(14) 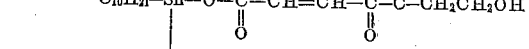

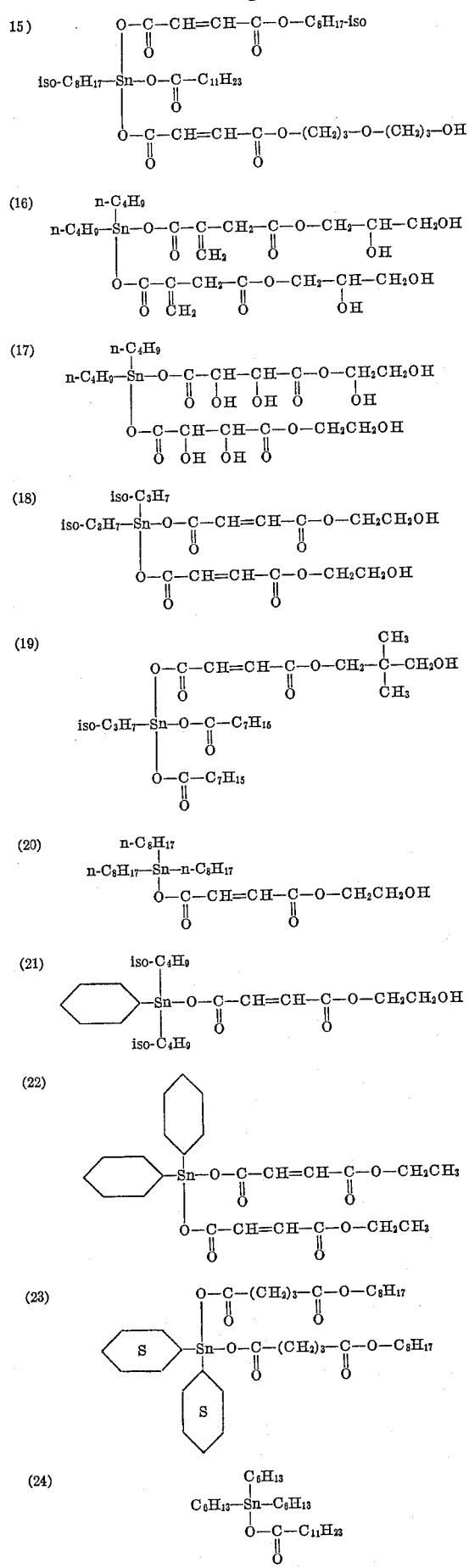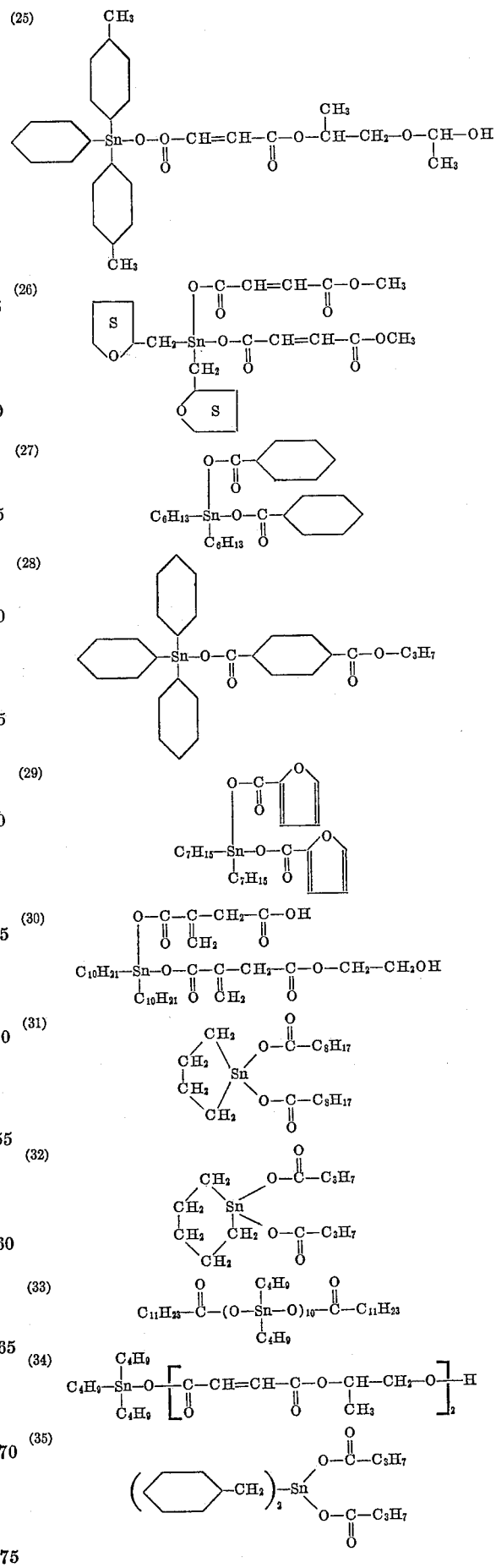

(36) 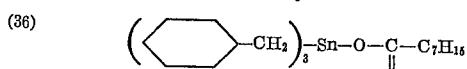

(37) 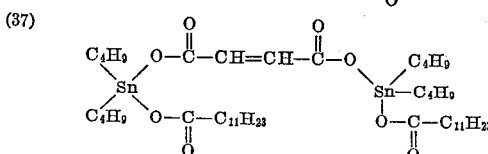

(38) 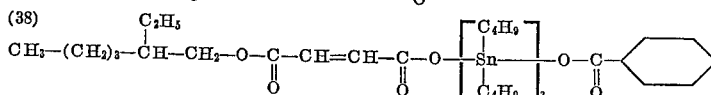

(39) 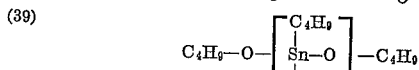

(40) 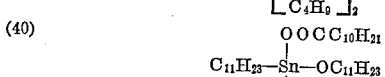

(41) 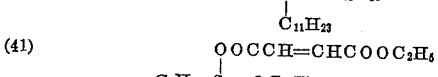

(42) 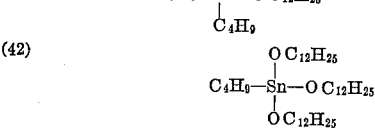

These compounds are readily prepared by well-known means. For example, the preferred tin carboxylate compounds are prepared from the corresponding organotin oxides and stannonic acids, which react with the organic carboxylic acid to yield derivatives applicable to the invention. The reactions for such preparations are as follows:

(1) 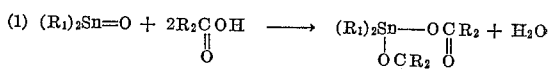

(2) 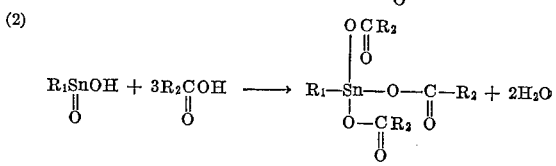

(3) 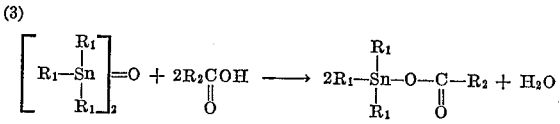

Additional details on the preparation of organotin compounds can be had by reference to the publication, "The Development of the Organotin Stabilizers" by H. Verity Smith (The Tin Research Institute, Middlesex, England, 1959).

The second component of the stabilizing combination of this invention, the aromatic amine, can be represented by the formula

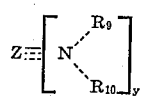

wherein Z is an aromatic nucleus containing one or more separate or condensed aromatic rings, such as benzene and naphthalene rings, the nitrogen atom being attached to the ring as a substituent, or constituting a ring atom in a heterocyclic ring, which may itself be saturated or unsaturated, or even aromatic, and wherein $R_9$ and $R_{10}$ are present depending on the number of valences of the nitrogen unattached to the ring. $R_9$ and $R_{10}$ can each be hydrogen or aliphatic alkyl, aryl, alkaryl, aralkyl or cycloalkyl hydrocarbon groups containing from one to thirty carbon atoms. Preferably, each of $R_9$ and $R_{10}$ contains from one to ten carbon atoms. Where the nitrogen is part of a heterocyclic group, $R_9$ and $R_{10}$ can be taken together as in the case of N-phenyl piperidine:

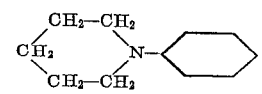

or one of the R's can be linked to the aromatic nucleus, as in the case of 2,2,3-trimethyl dihydroquinoline:

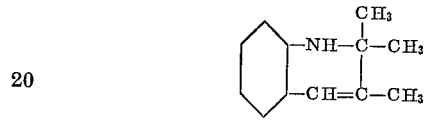

In the general formula, $y$ can be any integer from one to the maximum number of available positions for substituents on the aromatic nucleus, usually six or eight per nucleus. The aromatic nucleus can also contain other substituents not reactive with halogen containing resins. Thus, for example, there can be hydrocarbon groups containing from 1 to about 30 carbon atoms such as aliphatic groups, for example, alkyl and alkenyl, aromatic groups, for example, phenyl, alkaryl and aralkyl groups, and cycloaliphatic, for example, cycloalkyl, halogen, alkoxy or acyl

where R' is alkyl, aryl or hydrogen] groups as substituents, along with the amine groups on the aryl nucleus.

Representative aryl amines include the following:
Isopropoxydiphenylamine, aniline, N-methyl aniline, phenyl-beta-naphthylamine, N-benzyl aniline, diphenylamine, phenyl-alpha-naphthylamine, dioctyldiphenylamine, monooctyldiphenylamine, reaction product of diphenylamine and acetone, butyraldehyde-aniline condensation product, p-(p-tolylsulfonylamido)-diphenylamine, di-p-methoxy-diphenylamine, p-phenylenediamine, N,N'-diphenyl-p-phenylenediamine, di-beta-naphthyl-p-phenylenediamine, N-cyclohexyl-N'-phenyl-p-phenylenediamine, dioctyl-p-phenylenediamine, N,N' - diphenylethylenediamine, N,N'-diortho-tolylethylenediamine, diphenylpropylenediamine, N,N'-di-sec-butyl-p-phenylenediamine, diaminodiphenylmethane, N-isopropyl-N'-phenyl-p-phenylenediamine, m-toluene diamine, 6-phenyl-2,2,4-trimethyldihydroquinoline, 6-ethoxy-2,2,4-trimethyldihydroquinoline, 2,6-diethyl-2,3,4-trimethyldihydroquinoline, 2,2,4-trimethyldihydroquinoline (monomer or polymerized).

These stabilizer combinations, as has been indicated, are particularly effective for polyvinyl chloride resins of all types, by whatever process they are prepared, including solution-polymerized, emulsion-polymerized and suspension-polymerized resins, to name only a few. The term "polyvinyl chloride" as used herein is inclusive not only of polyvinyl chloride homopolymers of all types, and after-chlorinated polyvinyl chloride, but also of copolymers of vinyl chloride in a major proportion, and other copolymerizable monomers in minor proportion, such as copolymers of vinyl chloride and vinyl acetate, copolymers of vinyl chloride and vinylidene chloride, copolymers of vinyl chloride and acrylonitrile, copolymers of vinyl chloride with maleic or fumaric acid esters and copolymers of vinyl chloride with styrene, and also mixtures of polyvinyl chloride resins in a major proportion with a minor proportion of other synthetic resins, such as chlorinated polyethylene, or copolymers of acrylonitrile, butadiene and styrene. Among the polyvinyl chlorides which can be stabilized are the uniaxially-stretch-oriented polyvinyl chloride described in U.S. Patent No. 2,984,593 to Isaksem et al., that is, syndiotactic polyvinyl chloride, as well as stactic and isotactic polyvinyl chlorides.

The stabilizing combinations of this invention can, if desired, be employed in conjunction with other stabilizers for polyvinyl chloride resins, although, in most cases, the stabilization imparted by the combinations of this invention will be sufficient. In some cases, however, for particular end uses, special stabilization effects may be desired. Where desired, various conventional ultraviolet absorbers may be employed in conjunction with the composition of this invention.

Polyvinyl chloride stabilized by means of this invention will typically contain from about 0.001 to about 0.5 part of the amine and from about 0.2 to about 10 parts of organotin compound, by weight per 100 parts of polyvinyl chloride resin. Preferably, there should be from about 0.01 to about 0.2 parts of amine and from about 0.5 to about 5 parts of organotin compound by weight per 100 parts of resin.

Thus, the stabilizer compositions of this invention can contain from about 0.0001 to about 2.5 parts of aromatic amine per part of organotin compound and preferably from about 0.002 to about 0.4 part of aromatic amine per part by weight of organotin compound. The proportion of amine to organotin compound employed in the stabilizing combination of the invention is determined by the temperature at which protection is desired. The higher the ultimate temperature to which the stabilized composition is to be subjected the larger the amount of stabilizing combination. More stabilizer combination can be used, but usually no better result is obtained, and therefore such amounts are uneconomical and wasteful. In general, the amines do not enhance the light stability of polyvinyl chloride resins. Accordingly, as little amine as possible should be added to the resin in order not to adversely affect light stability. Where light stability is not important, of course, more amine may be added. In this connection, compounds in which the nitrogen groups form part of a heterocyclic ring, as in quinoline compounds, are preferred in that they appear to have the least damaging effect on light stability.

Polyvinyl chloride resin compositions may also contain a plasticizer for the resin, such as dioctyl phthalate, dioctyl sebacate and tricresyl phosphate.

Particularly useful plasticizers are the epoxy higher esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of course, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

A small amount, usually not more than 1.5%, of a parting agent, also can be included. Typical parting agents are the higher aliphatic acids and salts having from twelve to twenty-four carbon atoms, such as stearic acid, lauric acid, palmitic acid and myristic acid, lithium stearate and calcium palmitate, mineral lubricating oils, polyvinyl stearate, polyethylene and paraffin wax.

The preparation of the stabilized composition is easily accomplished by conventional procedures. The selected stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a 2-roll mill at from 250 to 350° F. for a time sufficient to form a homogenous sheet, five minutes, usually. After the mass is uniform, it is sheeted off in the usual way.

The following examples in the opinion of the inventors represent preferred embodiments of polyvinyl chloride resin compositions of their invention and exhibit the synergistic effect obtained thereby.

EXAMPLE I

A series of formulations was prepared having the following compositions:

Plastic composition: Parts by weight
Geon 103 Ep (homopolymer of polyvinyl chloride)_ 150
Mineral oil _____ 0.75
Stabilizer _____ As noted The stabilizer was added in proportion noted in Tables I and II and was blended with the polyvinyl chloride and the mixture was heated on a two-roll mill up to 350° F. and then tested in an oven at 350° F. and 375° F. for heat stability. The discoloration and clarity were noted, and the color is reported in Tables I and II below wherein Table I refers to the tests conducted at 350° F. and Table II to the tests conducted at 375° F.

*Table I*
350° F.

| Composition Number | A | B | C | D |
|---|---|---|---|---|
| Stabilizing Composition | 4.5 parts of dibutyltin-bis-(dipropylene glycol maleate). | 0.1 part of phenyl-beta-naphthylamine. | 4.25 parts of dibutyltin-bis (dipropylene glycol maleate) and 0.1 part of phenyl-beta-naphthylamine. | 4.5 parts dibutyl tin dioctyl thioglycolate. |
| | Color | Color | Color | Color |
| Time of Heating: | | | | |
| Initial | Colorless | Colorless | Colorless | Colorless. |
| After 15 min | Very pale yellow | Red | Very pale yellow | Do. |
| After 30 min | ____do____ | Charred | ____do____ | Do. |
| After 45 min | Pale yellow | | ____do____ | Very pale yellow. |
| After 60 min | Yellow | | ____do____ | Pale yellow. |
| After 75 min | ____do____ | | Pale yellow | Light yellow. |
| After 90 min | Deeper yellow | | ____do____ | Do. |
| After 105 min | Yellow-brown | | ____do____ | Do. |
| After 120 min | Charred | | ____do____ | Yellow. |

Table II

| Composition Number | A | B | C | D |
|---|---|---|---|---|
| Stabilizing Composition | 4.5 parts of dibutyltin-bis-dipropylene glycol maleate. | 0.1 part of phenyl-beta-naphthylamine. | 4.25 parts of dibutyltin-bis dipropylene glycol maleate and 0.1 part of phenyl-beta-naphthylamine. | 4.5 parts dibutyl tin dioctyl thioglycolate. |
| | 375° F. | | | |
| | Color | Color | Color | Color |
| Time of Heating: | | | | |
| Initial | Colorless | Colorless | Colorless | Colorless. |
| After 15 min | Pale yellow | Charred | Very pale yellow | Pale yellow. |
| After 30 min | Yellow | | Pale yellow | Do. |
| After 45 min | Brown-yellow | | do | Yellow. |
| After 60 min | Olive | | do | Do. |
| After 75 min | Brown | | do | Do. |
| After 90 min | | | Yellow | Orange-yellow. |
| After 105 min | | | Orange | Orange-brown. |
| After 120 min | | | Red | Brown. |
| | | | Red-brown | Deep brown. |

The results clearly indicate that the stabilizer compositions of this invention, exemplified by Composition C, have a stabilizing effect upon polyvinyl chloride resins which is better than that of a typical sulphur-containing organotin stabilizer compound, dibutyl tin dioctyl thioglycolate, illustrated by Composition D at both 350° F. and 375° F.

Compositions A, B and C together clearly indicate the synergistic effect obtained by means of this invention. Thus the result obtained with either A, dibutyl tin-bis-dipropylene glycol maleate alone or with B, phenyl-beta-napthylamine alone are in no way comparable to the very favorable results obtained with C, the composition employing the two compounds together.

Composition D at all times exhibited a very unpleasant odor while Composition C had substantially no odor.

EXAMPLE II

In accordance with the procedure of Example I, a series of formulations was prepared containing 150 parts by weight of Geon 103 Ep, 0.75 part of mineral oil, and stabilizer combinations as noted in Table III. The resultant compositions were tested for heat stability at 350° F., and data is recorded in Table III.

The results of Table III show the effectiveness of several stabilizer combinations falling within the scope of this invention. All of the compositions of Table III showed a better stability to heating at 350° F. than did dibutyltin-bis-(dipropylene glycol maleate), a conventional stabilizer (Composition A of Table I).

EXAMPLE III

The procedure of Example I was repeated, using as the resin 127.5 parts of "Vinylite VYHH," a copolymer of 87% vinyl chloride and 13% vinyl acetate, and 22.5 parts of "Vinylite VYNS," a copolymer of 90% vinyl chloride and 10% vinyl acetate. The stabilizer combination employed was 4.0 parts of dibutyl tin bis-(monoisooctyl maleate) and 0.08 part of phenyl beta naphthylamine. The resulting composition remained colorless for a substantial period of time and had only yellowed slightly at the end of two hours of heating at 350° F. indicating that the stabilizer combinations of this invention are also applicable to copolymers of vinyl chloride.

EXAMPLE IV

To show the effect of a conventional plasticizer on the compositions of this invention, the following materials

Table III

| Composition No. | E | F | G | H | I |
|---|---|---|---|---|---|
| Organotin compound | Dibutyl tin bis-(monoisooctyl maleate), 4.2 parts. | Di-n-octyl tin bis-(dipropylene glycol maleate), 4.0 parts. | Tri-n-octyl tin monoisooctyl maleate, 4.2 parts. | Dibutyl tin bis (monoisooctyl maleate), 4.0 parts. | Dibutyl tin bis (monoisooctyl fumarate), 5.0 parts. |
| Amine compound | Octyldiphenylamine,* 0.03 part. | 6-phenyl 2,2,4-trimethyldihydroquinoline, 0.04 part. | 6-ethoxy-2,2,4-trimethyldihydroquinoline, 0.06 part. | 2,2,4,6-tetramethyldihydroquinoline, 0.06 part. | Phenyl beta naphthyl amine, 0.07 part. |
| | 350° F. | | | | |
| | Color | Color | Color | Color | Color |
| Time of Heating: | | | | | |
| Initial | Colorless | Colorless | Colorless | Colorless | Colorless. |
| After— | | | | | |
| 15 minutes | Very pale yellow | Very pale yellow | Very pale yellow | Very pale yellow | Very pale yellow. |
| 30 | do | do | do | do | Do. |
| 45 | Pale yellow | Pale yellow | do | do | Do. |
| 60 | do | do | Pale yellow | Pale yellow | Pale yellow. |
| 75 | do | do | do | do | Do. |
| 90 | do | do | do | do | Do. |
| 105 | do | do | do | do | Do. |
| 120 | do | do | do | do | Very pale yellow. |
| | | | | | Do. |

*A commercial mixture of octyldiphenylamines known as "Agerite Stalite".

were blended as in Example I and tested for heat stability at 350° F.

Plastic composition: Parts by weight
Geon 101 Ep (polyvinyl chloride homopolymer) ------ 100
Dioctyl phthalate (plasticizer) ------ 50
Stabilizer (as noted in Table IV).

The results tabulated in Table IV show that compositions L and N embodying the stabilizer combination of this invention retain their color for longer periods of time than do polyvinyl chloride compositions not employing the stabilizer combination of this invention. Although the results indicate that this invention is considerably more effective in protecting unplasticized polyvinyl chloride resins, a marked improvement in heat stability is obtained when the stabilizing combinations are used in conjunction with plasticized resins. Thus, while the compositions employing only an organotin salt stabilizer had turned brown and substantially opaque by the end of two hours at 350° F., the two samples containing the stabilizer combination of this invention were lighter in color and were substantially transparent.

*Table IV*

| Composition No. | J | K | L | M | N |
|---|---|---|---|---|---|
| Stabilizing Composition | Dibutyl tin maleate, 0.75 part. | 0.05 part phenyl beta naphthylamine. | 0.70 part dibutyl tin maleate 0.05 part phenyl beta naphthylamine. | 1.5 part dibutyl tin bis (dipropylene glycol maleate). | 1.4 part dibutyl tin bis (monoisooctyl maleate) 0.05 part phenyl beta naphthylamine. |
| | Color | Color | Color | Color | Color |
| Time of Heating: | | | | | |
| Initial | Colorless | Colorless | Colorless | Colorless | Colorless. |
| After— | | | | | |
| 15 minutes | ---do--- | Red | ---do--- | ---do--- | Do. |
| 30 | ---do--- | Dark brown | ---do--- | ---do--- | Do. |
| 45 | Pale yellow | Black | Pale yellow | Very pale yellow | Very pale yellow. |
| 60 | Yellow | | Yellow | Pale yellow | Pale yellow. |
| 75 | Deep yellow | | Deep yellow | ---do--- | Do. |
| 90 | Orange | | Orange | Yellow | Yellow. |
| 105 | Dark Brown | | ---do--- | Brown-yellow | Do. |
| 120 | ---do--- | | ---do--- | Brown | Do. |

I claim:
1. A polyvinyl chloride resin composition having improved resistance to deterioration when heated at 350° F., consisting essentially of a polyvinyl chloride resin and a polyvinyl chloride resin stabilizer system consisting essentially from about 0.2 to about 10% by weight of the resin of an organotin compound in which the tin is in a tetravalent state having organic radicals linked through tin only through carbon and oxygen, at least one organic radical being linked to tin through carbon, and at least one organic radical being linked to tin through oxygen, and an aromatic amine having the formula:

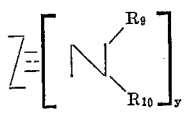

in which

is an aromatic hydrocarbon nucleus, $R_9$ and $R_{10}$, which can be taken together to form a heterocyclic group including the nitrogen, are present in sufficient number to satisfy the free valences of the nitrogen, and are selected from the group consisting of hydrogen, monovalent alkyl, aryl, alkaryl, aralkyl, and cycloalkyl groups, and bivalent alkylene, arylene, alkarylene, aralkylene and cycloalkylene groups, said groups having from one to about thirty carbon atoms, and $y$ is an integer within the range from one to the maximum number of available substituent positions on the aromatic nucleus, the aromatic amine being in an amount within the range from about 0.0001 to about 2.5 parts per part of the organotin compound, sufficient to enhance the stabilizing effect of the organotin compound.

2. A polyvinyl chloride resin composition in accordance with claim 1 wherein one of the organic radicals linked to tin in the organotin compound is a carboxylate radical of an unsaturated dicarboxylic acid.

3. A polyvinyl chloride resin composition in accordance with claim 2 wherein the unsaturated dicarboxylic acid is maleic acid.

4. A polyvinyl chloride resin composition in accordance with claim 2 wherein the unsaturated dicarboxylic acid is fumaric acid.

5. A polyvinyl chloride resin composition in accordance with claim 1 wherein the organotin compound contains at least one group attached to the tin atom through oxygen which is a half ester of an unsaturated dicarboxylic acid with an alcohol having from one to two hydroxyl groups.

6. A polyvinyl chloride resin composition in accordance with claim 5 in which the organotin compound contains at least one octyl maleate group attached directly to tin.

7. A polyvinyl chloride resin composition in accordance with claim 1 wherein the aromatic amine compound contains a heterocyclic nitrogen atom.

8. A polyvinyl chloride resin composition in accordance with claim 7 wherein the aromatic amine is a quinoline compound.

9. A polyvinyl chloride resin composition in accordance with claim 1 wherein the polyvinyl chloride resin is a polyvinyl chloride homopolymer.

10. A polyvinyl chloride resin composition in accordance with claim 1 wherein the organotin compound is dibutyl tin-bis-dipropylene glycol maleate.

11. A polyvinyl chloride resin composition in accordance with claim 1 wherein the organotin compound is dibutyl tin-bis-monoisooctyl maleate.

12. A polyvinyl chloride resin composition in accordance with claim 1 wherein the amine is phenyl beta naphthylamine.

13. A polyvinyl chloride resin composition in accordance with claim 1 wherein the amine is 2,3,4,6-tetramethyl-dihydroquinoline.

References Cited by the Examiner

UNITED STATES PATENTS

| | | | |
|---|---|---|---|
| 2,725,373 | 11/1955 | Reynolds | 260—45.9 XR |
| 2,832,753 | 4/1958 | Weinberg et al. | 260—45.75 |
| 2,895,941 | 7/1959 | Montgomery et al. | 260—45.75 |
| 2,977,379 | 3/1961 | Dorfelt et al. | 260—45.75 XR |
| 2,985,617 | 5/1961 | Salyer et al. | 260—45.75 XR |
| 3,019,247 | 1/1962 | Mack et al. | 260—45.75 |

LEON J. BERCOVITZ, *Primary Examiner.*

A. D. SULLIVAN, J. R. LIEBERMAN, *Examiners.*

UNITED STATES PATENT OFFICE
CERTIFICATE OF CORRECTION

Patent No. 3,222,317                            December 7, 1965

Otto S. Kauder

It is hereby certified that error appears in the above numbered patent requiring correction and that the said Letters Patent should read as corrected below.

Column 1, line 71, for "enchancing" read -- enhancing --; column 5, lines 16 to 22, formula (17) should appear as shown below instead of as in the patent:

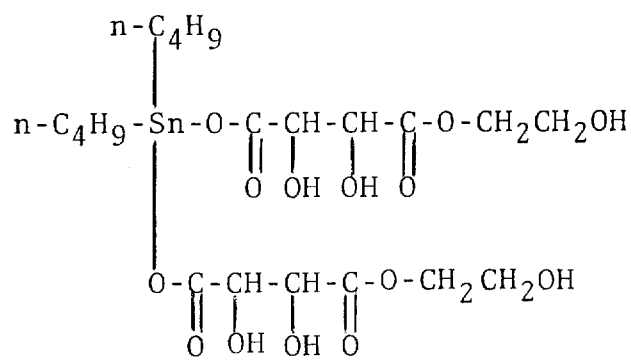

column 6, lines 1 to 14, formula (25) should appear as shown below instead of as in the patent:

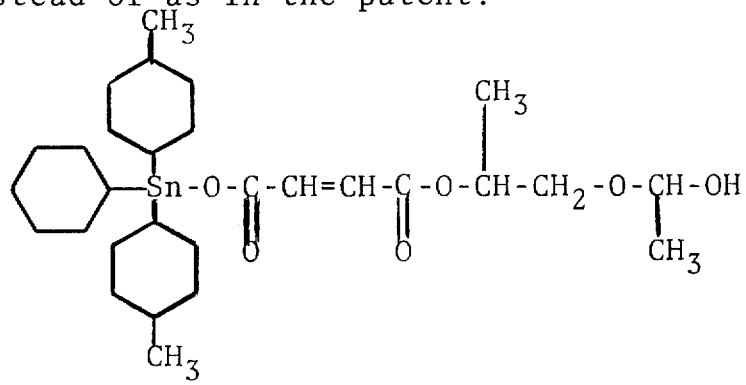

columns 11 and 12, Table III, third column, line 15 thereof, for "do" read -- Light yellow --; column 13, line 55, before "from" insert -- of --.

Signed and sealed this 4th day of October 1966.

(SEAL)
Attest:

ERNEST W. SWIDER
Attesting Officer

EDWARD J. BRENNER
Commissioner of Patents